(12) United States Patent
Tsubouchi et al.

(10) Patent No.: US 6,222,300 B1
(45) Date of Patent: Apr. 24, 2001

(54) COMMUNICATION SYSTEM USING A SURFACE ACOUSTIC WAVE-MATCHED FILTER

(75) Inventors: Kazuo Tsubouchi, Sendai; Hiroaki Sasaki, Kakuda; Kazuyoshi Sugai; Kazuma Soeta, both of Kooriyama; Tomohiko Shibata, Kasugai, all of (JP)

(73) Assignee: Kazuo Tsubouchi, Sendai (JP)

( * ) Notice: Subject to any disclaimer, the term of this patent is extended or adjusted under 35 U.S.C. 154(b) by 0 days.

(21) Appl. No.: 09/435,190

(22) Filed: Nov. 5, 1999

(30) Foreign Application Priority Data

Nov. 10, 1998 (JP) .................................................. 10-318770

(51) Int. Cl.⁷ .................................................. H01L 41/08
(52) U.S. Cl. .................................................. 310/313 R
(58) Field of Search ........................... 310/313 R, 313 D; 333/190–195; 455/525, 550; 370/350

(56) References Cited

U.S. PATENT DOCUMENTS

| | | | | |
|---|---|---|---|---|
| 4,651,327 | * | 3/1987 | Fujita | 375/1 |
| 5,260,469 | * | 11/1993 | Kato et al. | 375/1 |
| 5,367,216 | * | 11/1994 | Egara et al. | 310/313 R |
| 5,889,493 | * | 3/1999 | Endo | 342/357 |
| 5,922,073 | * | 7/1999 | Shimasa | 713/200 |
| 6,052,602 | * | 4/2000 | Yamamoto et al. | 455/525 |

FOREIGN PATENT DOCUMENTS 1-123516   5/1989   (JP) .

\* cited by examiner

*Primary Examiner*—Mark O. Budd
(74) *Attorney, Agent, or Firm*—Burr & Brown

(57) ABSTRACT

A spectrum diffusion signal including data representing a center frequency of an acoustic surface filter in a transmitter side is transmitted with its carrier-frequency being swept. When a receiver side receives a modulation signal, a spectrum diffusion signal including data representing a center frequency of an acoustic surface filter in a receiver side is transmitted on the carrier-frequency equal to the center frequency of the surface acoustic wave matched filter in the transmitter side included in the modulation signal. Thereafter, the transmitter side transmits spectrum diffusion signals having the carrier-frequency equal to the center frequency of the surface acoustic wave matched filter in the receiver side included in the modulation signal.

9 Claims, 6 Drawing Sheets

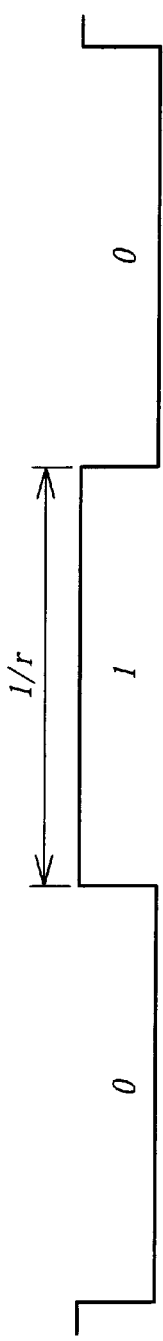
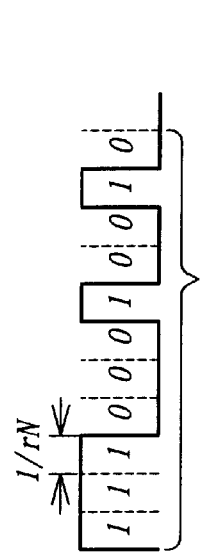
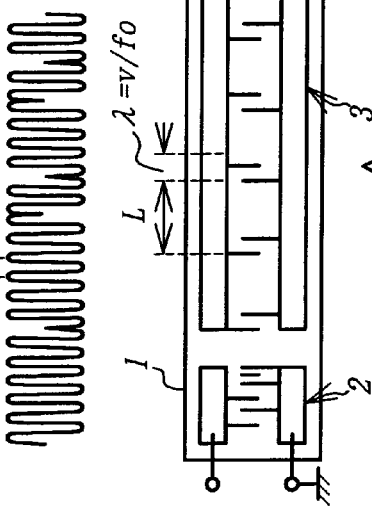
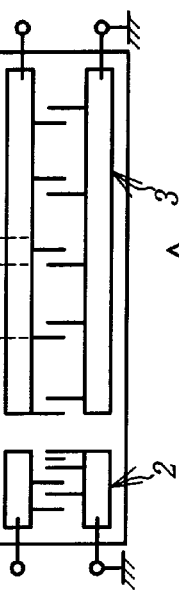
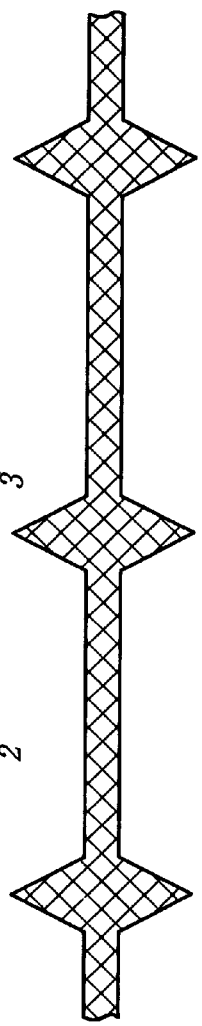
FIG. 1A
FIG. 1B
FIG. 1C
FIG. 1D
FIG. 1E

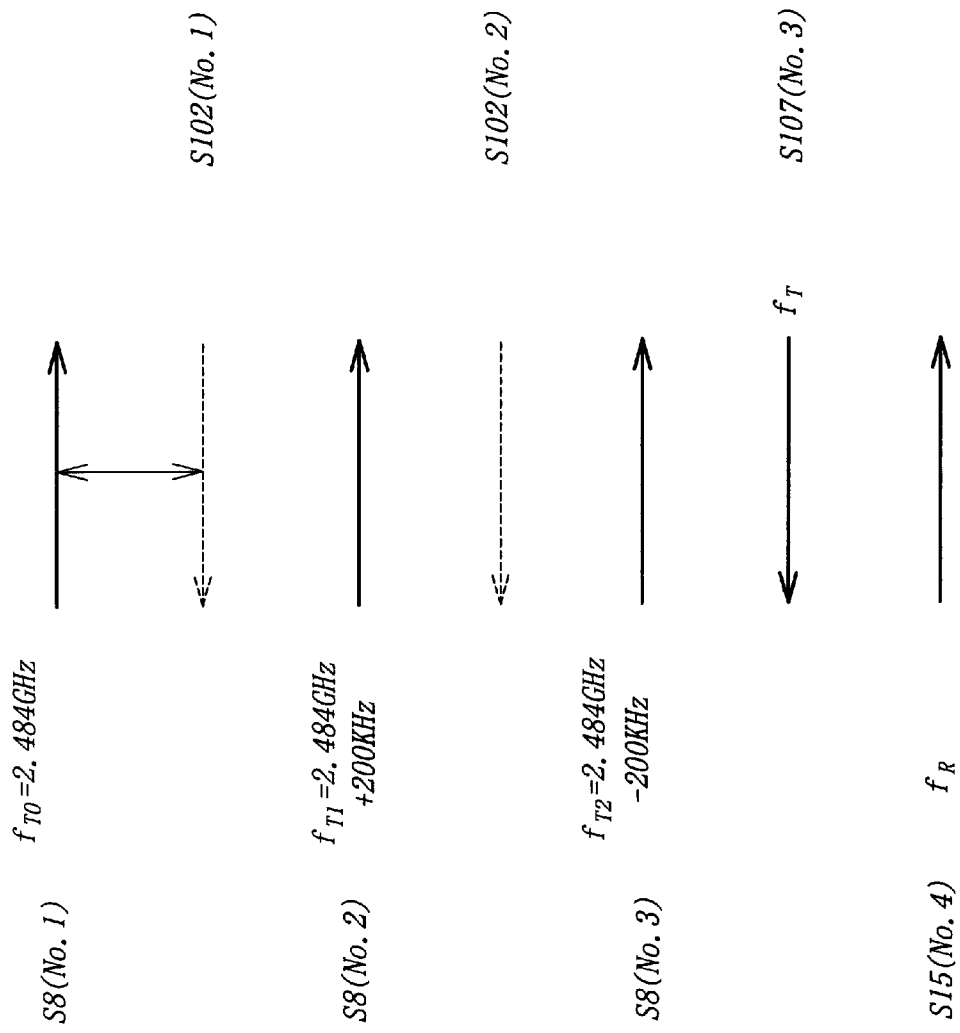

COMMUNICATION SYSTEM USING A SURFACE ACOUSTIC WAVE-MATCHED FILTER

BACKGROUND OF THE INVENTION

1. Field of the Invention

This invention relates a communication system to demodulate a spectrum diffusion signal which uses a surface acoustic wave matched filter comprising, on a surface of a substrate made of a piezoelectric material, an input side electrode into which a spectrum diffusion signal detected are supplied and an output side electrode constituting delay lines with taps which outputs a demodulation signal by detecting the surface acoustic wave propagated from the input side electrode.

2. Description of the Prior Art

The above-mentioned sort of surface acoustic wave matched filter, also called as a surface acoustic wave collimater, widely used to demodulate spectrum diffusion signals in spectrum diffusing communications. FIG. 1 are diagrammatic views showing an operation principle in such a spectrum diffusing communication. FIG. 1A shows abase band signal having a date rate of e.g. 2 Mbps (bits/second). The base band signal is demodulated by a PN code having a N=11 code length of "11100010010" shown in FIG. 1B. Thus, the chip rate of the PN code is 22 Mbps.

FIG. 1C shows a spectrum diffusion signal obtained by demodulating a carrier having a $f_0$ frequency with the PN code-demodulated signal. Thus, the spectrum diffusing frequency has a $f_0$ center frequency corresponding to the frequency of the carrier.

FIG. 1D shows the condition in which the thus obtained spectrum diffusion signal is transmitted and supplied to an input side electrode 2 in a surface acoustic wave matched filter 1. The surface acoustic wave matched filter 1 has also an output side electrode 3 outputting a demodulated signal. The output side electrode 3 has delay lines with taps, and if a velocity of a surface acoustic wave propagating on a surface of the substrate in the surface acoustic wave matched filter is v, the surface acoustic wave has a frequency of $v/f_0$, a tap distance of $v/f_1$. Moreover, the output side electrode 3 has a tap pattern with an electrode finger-arrangement determined by the sign of the PN code. If the carrier frequency of the spectrum diffusion signal is coincide with the center frequency of the surface acoustic wave matched filter, which is idealistic condition, the output side electrode 3 outputs a demodulated signal strongly correlated with the original base band signal, as shown in FIG. 1E.

In transmitting the spectrum diffusion signal by employing the above surface acoustic wave matched filter, the spectrum diffusion signal demodulated with the original date is transmitted from the transmitter side to the receiver side, and in the receiver side, the demodulated signal is obtained by letting the received spectrum diffusion signal through the surface acoustic wave matched filter. The precise reproduction of the original data in the receiver side requires that the center frequency of the surface acoustic wave matched filter be coincided with the carrier frequency $f_0$ of the spectrum diffusion signal at some degree of precision.

However, a center frequency of a conventional surface acoustic wave matched filter fluctuates due to the change of its operation temperature. It results from the changes of the tap distance and the velocity of the surface acoustic wave in the filter. When the center frequency of the surface acoustic wave matched filter fluctuates, it can not be synchronized with the spectrum diffusion signal inputted, which results in the degradation of the correlation peak level of the output signal obtained. Thus, the conventional filter can not reproduce the original data precisely.

For example, a thin film-substrate having an aluminum nitride film with piezoelectric nature of a 1 μm thickness on a sapphire substrate of a 0.5 mm thickness has a center frequency-fluctuation of 30 ppm/° C. Thus, if the center frequency of the surface acoustic wave matched filter composed of the thin film-substrate is 2.484 GHz, the frequency fluctuation thereof is 75 KHz/° C. When the center frequency is within a range of 2.484 GHz±800 KHz, the original data can not be reproduced precisely because the correlation peak of the output demodulated signal is degraded and more pseudo-peaks occur. Thus, a temperature fluctuation of about ±10° C. to a preset temperature may be allowed in the filter, but one larger than that may not. Such a narrow available temperature range does not enable the filter to be used as a very practical communication means. For example, portable communication equipment are required to be low electricity consumption, small size, and light in weight, so it can not be controlled in such a narrow temperature range. It may be usually used in a wide temperature range of −10° C. to 50° C., preferably −20° C. to 70° C. with sufficient reliability.

To iron out the fluctuation of the center frequency due to the temperature fluctuation in the surface acoustic wave matched filter as above-mentioned, the publication of unexamined patent application No. 1-123516 discloses that a received spectrum diffusion signal is supplied to a frequency modulator and is multiplied with a signal from a local oscillator having variable oscillating frequencies to generate a spectrum diffusion signal having a center frequency coincided with that of a surface acoustic wave matched filter, and the thus obtained spectrum diffusion signal is supplied to the filter. Such a method may reproduce an original data precisely because in the method, the spectrum diffusion signal having a carrier frequency equal to the center frequency of the filter is supplied thereto even in the temperature fluctuation.

However, the above method requires additional equipment such as a frequency modulator and a local oscillator, which results in communication equipment being large and heavy, increase of electricity consumption and large cost. Thus, the method is not practical for portable equipment particularly.

SUMMARY OF THE INVENTION

It is an object of the present invention to remove the conventional defects as above-mentioned and provide a communication system using a surface acoustic wave matched filter capable of transmitting data by preventing degradation of correlation peak of a demodulated output signal without installing a temperature controlling mechanism or a circuit with large electricity consumption even though a center frequency of the filter fluctuates largely.

This invention relates to a communication system to modulate a spectrum diffusion signal using a surface acoustic wave matched filter comprising, on a surface of a substrate made of a piezoelectric material, an input side electrode into which the spectrum diffusion signal is supplied and an output side electrode constituting delay lines with taps which outputs a modulated signal when receiving the surface acoustic wave transmitted from the input side electrode, comprising steps of:

transmitting, in a transmitter side, a spectrum diffusion signal to which data representing a center frequency of a surface acoustic wave matched filter in the transmitter side are added with its carrier-frequencies being swept, transmitting, in a receiver side, a spectrum diffusion signal to which data representing a center frequency of a surface acoustic wave matched in the receiver side are added, on the carrier-frequency corresponding to the center frequency of the surface acoustic wave matched filter in the transmitter side which is added to the detect spectrum diffusion signal from the transmitter side when detecting, in the receiver side, a carrier-frequency to modulate a significant signal from the surface acoustic wave matched filter in the receiver side, and transmitting, in the transmitter side, successive spectrum diffusion signals on the carrier-frequency represented by the data of the center frequency of the surface acoustic wave matched filter in the receiver side, which are added to the detected spectrum diffusion signal from the receiver side.

In a preferred embodiment of the communication system according to the present invention, the sweeping the carrier-frequencies for the spectrum diffusion signal is carried out stepwise in the transmitter side and moves to next step when the signal transmission from the receiver side is not within a given waiting period. In this case, the stepwise sweeping is preferably carried out alternately up and down within a given step width from the designed center frequency of the surface acoustic wave matched filter as its sweeping center. In this case, the step width is preferably 100–800 KHz, for example, and the sweeping range of the carrier-frequency of the spectrum diffusion signal is not more than ±4 MHz of the designed center frequency. In this way, the communication system can be realized which uses the surface acoustic wave matched filter having the total sweeping time only within one second to two seconds and effectively usable in a wide operation temperature range of −20° C. to 70° C. Herein, the change rate with temperature of the center frequency of the surface acoustic wave matched filter is about 75 KHz/° C.

Moreover, as the data representing the center frequency of the above surface acoustic wave matched filter, the deviation from the operation temperature or the designed operation temperature of the filter or the deviation from the center frequency or the designed center frequency of the filter may be used.

BRIEF DESCRIPTION OF THE DRAWINGS

The invention will be more particularly described with reference to the accompanying drawings:

FIGS. 1A to 1E diagrammatic views for explaining the operation principle of the communication system using a surface acoustic wave matched filter in the present invention, FIG. 6 is a diagram showing the communicating operation according to the present invention.

DESCRIPTION OF THE PREFERRED EMBODIMENTS

The invention will be described in detail as follows, with reference to the above drawings.

Figure 2:
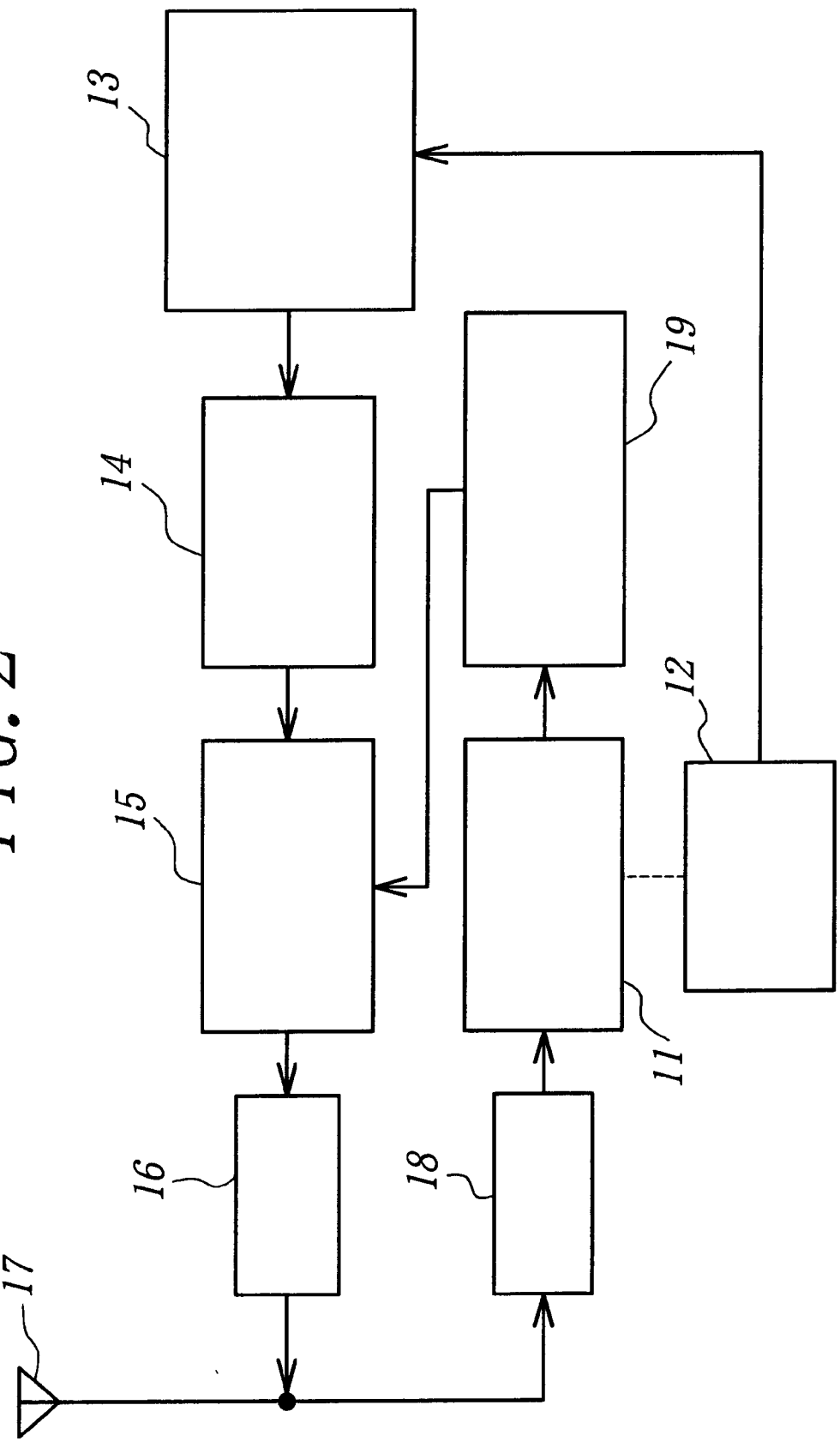
FIG. 2 is a block diagram showing a transmitter side construction in an embodiment of the communication system using a surface acoustic wave matched filter according to the present invention.
Figure 3:
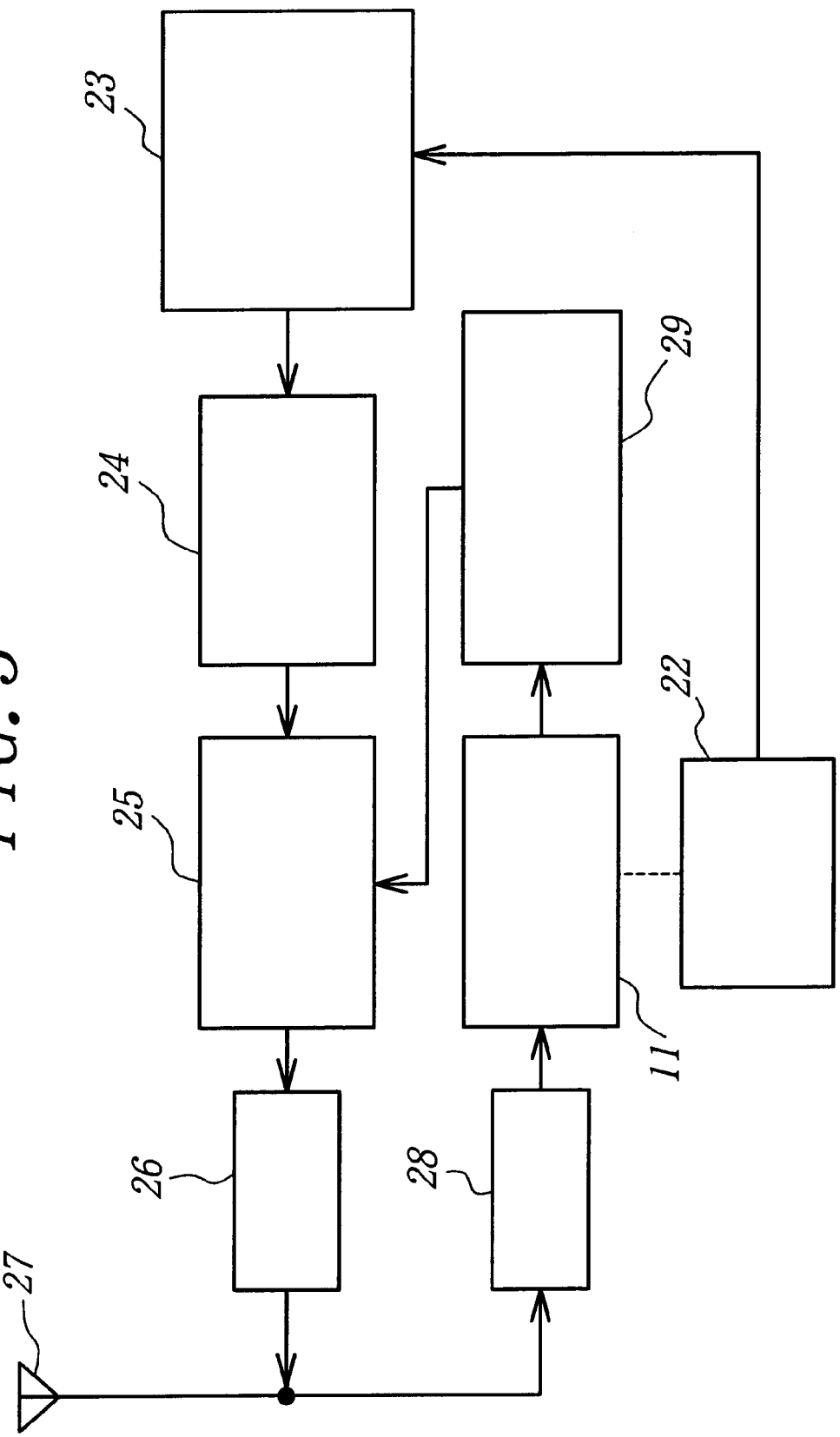
FIG. 3 is a block diagram showing a receiver side construction as in FIG. 2.

FIGS. 2 and 3 show the constructions of the transmitter side and the receiver side schematically in the communication system using a surface acoustic wave matched filter according to the present invention. Hereupon, the transmitter side and the receiver side are represented as in FIGS. 2 and 3 for explanation. In one instance, the transmitter side may serving as a receiver side, and in other instance, the receiver side may serving as a transmitter side. Both the transmitter side and the receiver side have the same construction, essentially.

First of all, in the transmitter side are provided a surface acoustic wave matched filter 11 to demodulate a spectrum diffusion signal from the receiver side, a temperature sensor 12 to measure the operation temperature of the filter, a center frequency-calculating part 13 to calculate a center frequency of the filter 11 in the transmission from the operation temperature measured by the temperature sensor, a center frequency data-working out part 14 to work out data representing the thus calculated center frequency, a spectrum diffusion signal-generating part 15 to generate a spectrum diffusion signal including the center frequency data with sweeping the carrier frequencies for the signal, a transmitter part 16 to transmit the thus generated spectrum diffusion signal and a two-way antenna 17.

Moreover, a receiver part 18 to receive the spectrum diffusion signal received at the two-way antenna 17 and to supply it to the surface acoustic wave matched filter 11 and a receiver side center frequency-detecting part 19 to detect the center frequency of the filter in the receiver side are provided. As is apparent from the operation principle described hereinafter, the information of the center frequency of the surface acoustic wave matched filter in the receiver side, detected at the receiver side center frequency-detecting part 19, is transmitted to the spectrum diffusion signal-generating part 15 and the spectrum diffusion signal having a propagating frequency equal to the center frequency is generated.

On the other hand, in the receiver side shown in FIG. 3 are provided a surface acoustic wave matched filter 21 to demodulate a spectrum diffusion signal from the transmitter side, a temperature sensor 22 to measure the operation temperature of the filter, a center frequency-calculating part 23 to calculate a center frequency of the filter 21 in the receiver side from the operation temperature measured by the temperature sensor, a center frequency data-working out part 24 to work out data representing the thus calculated center frequency, a spectrum diffusion signal-generating part 25 to generate a spectrum diffusion signal including the center frequency data so that the signal can have a propagating frequency equal to the center frequency of the surface acoustic wave matched filter 11 in the transmitter side, a transmitter part 26 to transmit the thus generated spectrum diffusion signal, a two-way antenna 27, a receiver part 28 to receive the spectrum diffusion signal received at the two-way antenna 27 and to supply to the filter 21, and a transmitter side center frequency-detecting part 29 to detect the center frequency of the filter in transmitter side from the modulated signal outputted from the filter.

Figure 4:
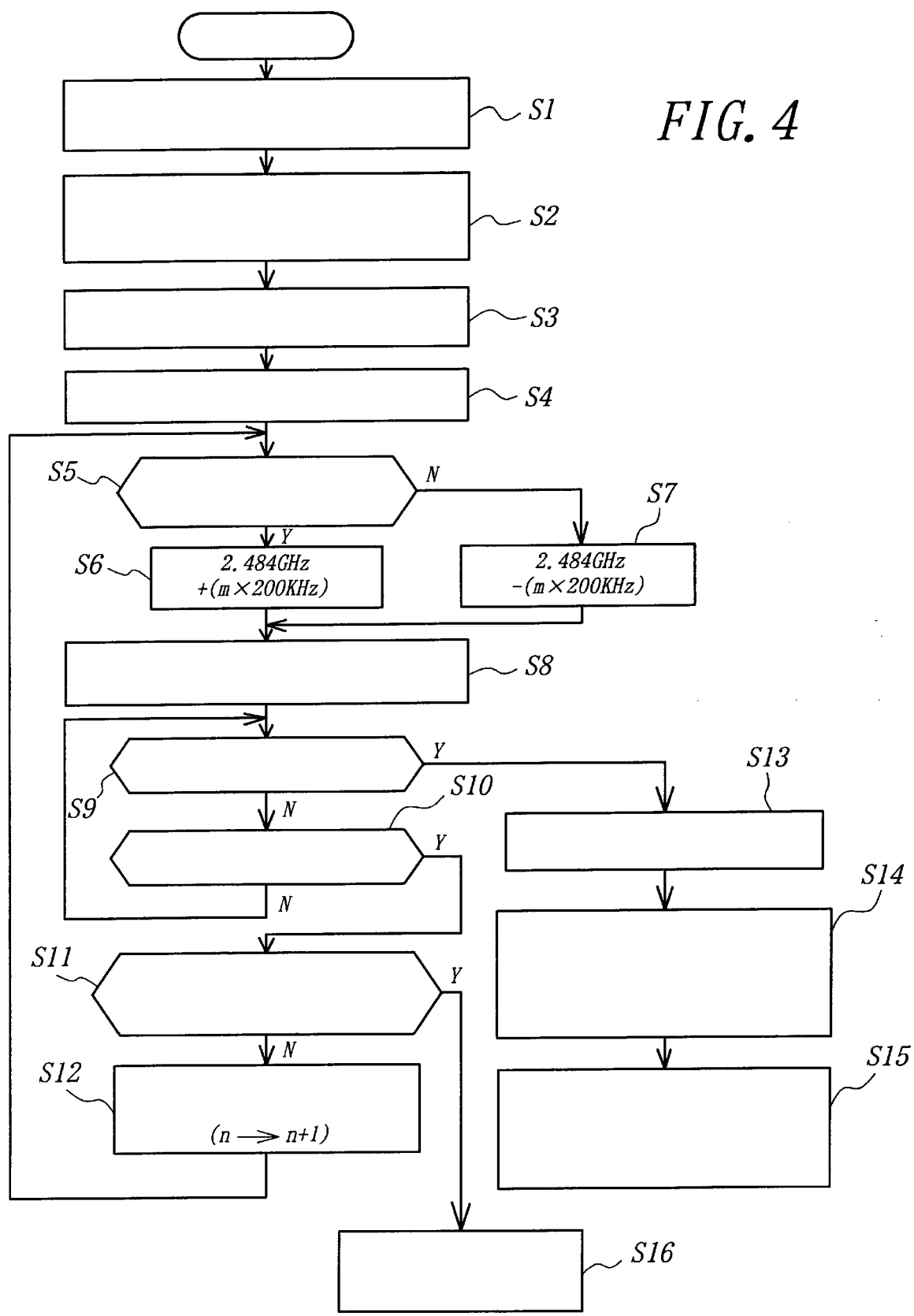
FIG. 4 is a flow chart for explaining the operation principle of the transmitter side.

Next, the operation principle of the communication system according to the present invention will be described in detail, with reference to the flow charts of FIGS. 4 and 5 and the diagram of FIG. 6.

First of all, in the transmitter side, the operation temperature of the surface acoustic wave matched filter 11 in the side is measured by the temperature sensor 12 (Step S1). The thus obtained temperature information is supplied to the center frequency-calculating part 13 of the filter (Step S2). This calculation may be performed, based on the data table of or the equation representing the relation between the temperature and the center frequency.

Subsequently, the thus calculated data representing the center frequency are worked out in the center frequency data-working out part 14 (Step S3). In this way, the spectrum diffusion signal including the center frequency data is generated, but in thin embodiment, the carrier-frequency of the spectrum diffusion signal is swept stepwise. Then, the stepwise sweeping is carried out alternately up and down within a given width from the designed center frequency of the surface acoustic wave matched filter as its sweeping center. Thus, in the first sweeping, the sweeping count "n" is set to "1" (Step S4).

Then, Step 5 judges whether the sweeping count "n" is an uneven number or an even number. Since in the first sweeping the sweeping count "n" is "1", uneven, Step S6 calculates the quotient "m" (omitted decimals) of the sweeping count "n" divided by 2 firstly and calculates the carrier-frequency from the equation "2.484 GHz–(m×200 KHz)". In this case, since the quotient "m" is "0", the carrier-frequency $f_{T0}$ equal to 2.484 GHz of the designed center frequency is calculated, so that the spectrum diffusion signal having that frequency is generated. The spectrum diffusion signal also includes the date representing the center frequency $f_T$ at that point of time of the surface acoustic wave matched filter in the transmitter side worked out in the center frequency date-working out part 14. The spectrum diffusion signal is transmitted from the two-way antenna 17 via the transmitter part 16 (Step S8). This condition is shown as Step S8 (No. 1) in FIG. 6.

On the other hand, the receiver side checks a modulation output (Step 101), but the modulation output can not be detected and nothing is transmitted from the receiver side when the carrier-frequency $f_{T0}$ of the transmitted spectrum diffusion signal is largely deviated from the center frequency of the surface acoustic wave matched filter 21 in the receiver side (Step S102). This condition is shown as Step S102 in FIG. 6.

The transmitter side judges the response from the receiver side, as shown in Step S9. Without the response, it judges the elapse of a 30 ms waiting time as shown in Step S10. If elapses, it judges the completion of the sweeping within a predetermined whole frequency range to be swept as shown in Step S11. If not completed, after the number of "1" is added to the sweeping count "n" (that is, n=2) in Step S12, the operation of the communication system according to the present return to Step S5. In this embodiment, the whole frequency range to be swept is set within ±4 MHz from 2.484 GHz of the designed center frequency. This range corresponds to a temperature change range of about 100° C. Consequently, in this embodiment, the communication system capable of being properly operated in a temperature change range of –20° C. to 70° C. can be provided.

Since in Step S5, the sweeping count "n" is "2", even, in Step S7, the value of "2.484 GHz+200 KHz calculated based on "m=1" is set as the carrier-frequency, and in Step S8, the spectrum diffusion signal having that carrier-frequency $f_{T1}$ is transmitted again. This condition is shown as Step S8 (No. 2) in FIG. 6. On the other hand, if the receiver side can not have a modulation output even at the carrier-frequency $f_{T1}$, it transmits nothing to the transmitter side, as above-mentioned. Thin condition is shown as Step S102 (No. 2) in FIG. 6.

As above-mentioned, the transmitter side judges a response from the receiver side as shown in Step S9, and without the response it judges the elapse of the 30 ms waiting time as shown in Step S10. If elapses, it judges the completion of the sweeping the predetermined whole frequency range to be swept as shown in Step S11, and if not completed, the number of "1" is added to the sweeping count "n" (that is, n=3), thereafter this operation returning to Step S5. In this embodiment, the period to complete the sweeping the whole frequency range to be swept is within two seconds.

The transmitter side sets the carrier-frequency to a frequency of 2.484 GHz–200 kHz in Step S6 because the sweeping count "n" is 3, uneven, in Step S5 as above-mentioned. Then, it transmits the spectrum diffusion signal having that frequency $f_{T2}$ again in Step S8. This condition is shown as Step S8 (No. 3) in FIG. 6.

Figure 5:
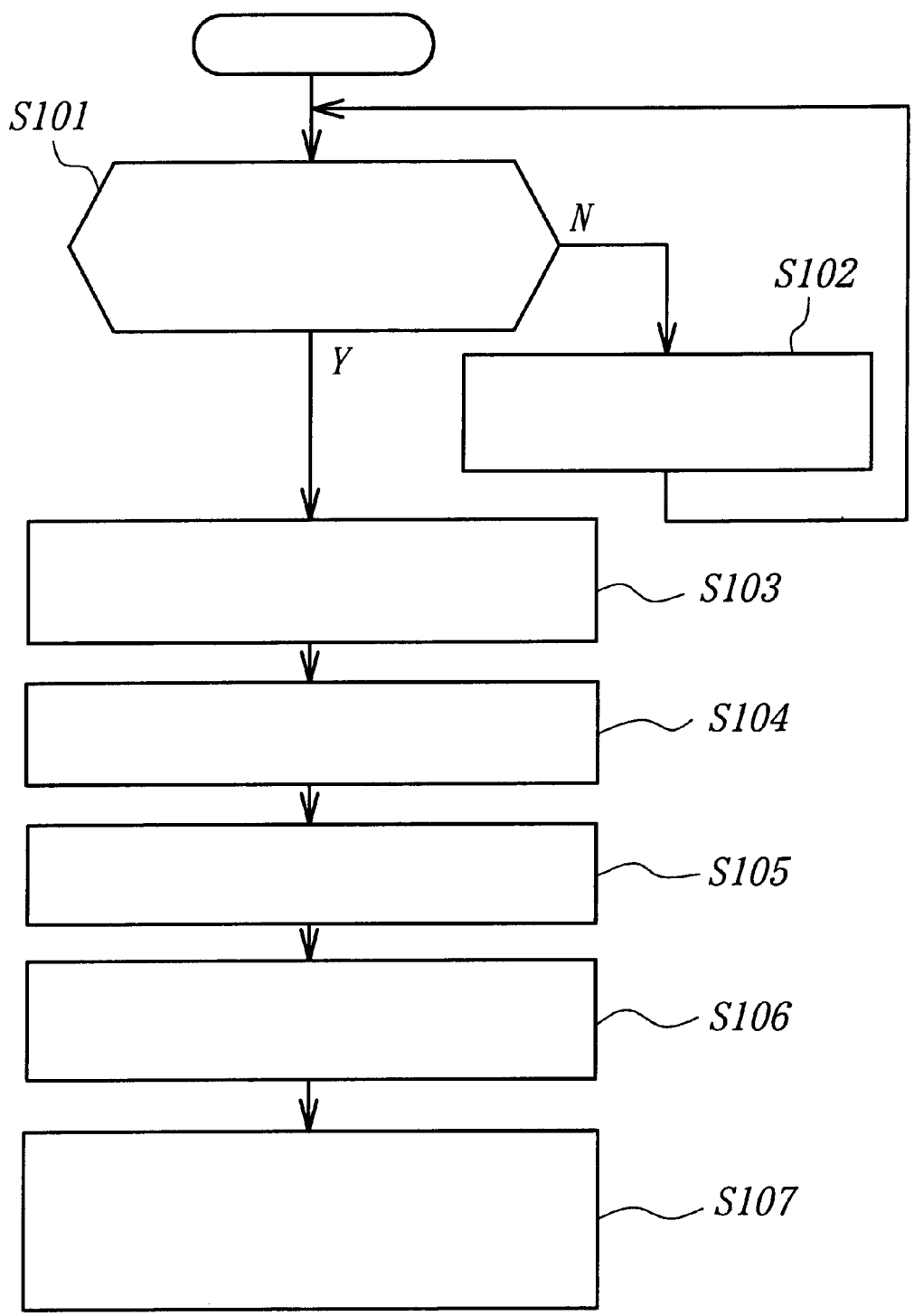
FIG. 5 is a flow chart for explaining the operation principle of the receiver side.

If, at this time, a significant modulation output is obtained from the surface acoustic wave matched filter 21 in the receiver side, in Step S103, the center frequency of the surface acoustic wave matched filter 11 in the transmitter side is detected from the data, included in the modulation output, of the center frequency $f_T$ of the filter 11 as shown in the flow chart of FIG. 5. Subsequently, the operation temperature of the surface acoustic wave matched filter 21 is measured by the temperature sensor 22 in Step S104, and the center frequency $f_R$ of the filter 21 is calculated in the receiver side filter-center frequency-calculating part 23 in Step S105. Then, in Step S106, the spectrum diffusion signal including the data representing the center frequency $f_R$ of the surface acoustic wave matched filter 21 is generated in the spectrum diffusion signal-generating part 25 so that the signal may have a carrier frequency of the center frequency $f_T$, detected as above-mentioned, of the surface acoustic wave matched filter 11 in the transmitter side. Subsequently, the spectrum diffusion signal is transmitted in Step S107. This transmission is shown as Step S107 (No. 3) in FIG. 6.

Since the propagation wave-frequency of the spectrum diffusion signal transmitted from the receiver side, as above-mentioned, is equal to the center frequency $f_T$ of the surface acoustic wave matched filter 11 in the transmitter side, the modulation output can be obtained from the filter. Thus, Step S9 in FIG. 4 judges the condition as "received a response" and Step S13 stops the sweeping. Then, as shown in Step S14, the center frequency $f_R$, included in the response signal, of the surface acoustic wave matched filter 21 in the receiver side is detected in the transmitter side filter-center frequency detecting part 19, and as shown in Step S15, the spectrum diffusion signal is generated so that it may have a carrier-frequency equal to the center frequency $f_R$, and is transmitted. This condition is shown as Step S15 (No. 4) in FIG. 6.

As above-mentioned, from the transmitter side, is transmitted the spectrum diffusion signal having the carrier-frequency of the center frequency $f_R$ of the surface acoustic wave matched filter 21 in the receiver side, and in the receiver side, can be transmitted information with transmitting the spectrum diffusion signal having the carrier-frequency of the center frequency $f_T$ of the surface acoustic wave matched filter 11 in the transmitter side. In this case, the communication condition of the information is always kept good by including, in the spectrum diffusion signal, the data about the center frequency of the surface acoustic wave matched filter itself all the time or only the time when the center frequency change beyond its allowable range. Moreover, when the transmitter side does not receive a response from the receiver side through the sweeping within the whole frequency range, Step S16 stops the sweeping as shown in FIG. 4.

The present invention is not limited to the above embodiment, and many variations and modifications may be made without departing from the scope of the present invention. For example, although in the above example, the designed center frequency of the surface acoustic wave matched filter is 2.484 GHz, the step width of the frequency-sweeping 200 KHz, the whole frequency range to be swept ±4 MHz, and the waiting time 30 ms, each of these values is one example, respectively. They may be changed within a range capable of obtaining a desired effect.

Moreover, in the above embodiment, the frequency-sweeping is performed stepwise up and down from the sweeping center of the designed center frequency, but may be in gradually decrease from the maximum frequency or in gradually increase from the minimum frequency. Furthermore, such a monotonous increase or decrease of the sweeping frequency does not always require the stepwise sweeping. The frequency-sweeping may be performed continuously, but the stepwise up and down sweeping from its sweeping center of the designed center frequency, as the above example, is desired because it can short the average sweeping time.

Although in the above embodiment, the spectrum diffusion signal is transmitted including the center frequency itself of the surface acoustic wave matched filter as the data of the frequency of the filter, it may includes the deviation from the designed center frequency, the operation temperature or the deviation from the designed operation temperature in the surface acoustic wave matched filter, etc., as the data representing the center frequency.

As above-mentioned, in the communication system using a surface acoustic wave matched filter according to the present invention, the spectrum diffusion signal including the data representing the center frequency of the surface acoustic wave matched filter in the transmitter side is transmitted with its carrier-frequency being swept. Then, if the receiver side receives the modulation signal, the spectrum diffusion signal including the data representing the center frequency of the surface acoustic wave matched filter in the receiver side and having the carrier-frequency equal to the center frequency, included in the modulation signal, of the surface acoustic wave matched filter in the transmitter side is transmitted. Accordingly, since the spectrum diffusion signal having the carrier-frequency equal to the center frequency, included in the modulation signal, of the surface acoustic wave matched filter is transmitted, the transmitter side can precisely achieve the data communication using the spectrum diffusion signal having the carrier-frequency equal to the center frequency and ensure good data transmission constantly over a wide temperature range even though the center frequency of the opposite surface acoustic wave matched filter, changing depending upon its temperature fluctuation, is unknown.

Moreover, in sweeping the carrier-frequency of the spectrum diffusion signal stepwise up and down from its sweeping center equal to the designed center frequency, as above embodiment, the waiting time to form a normal transmission guide between the transmitter side and the receiver side, that is, the sweeping time can be advantageously shorted.

What is claimed is:

1. A communication system to demodulate a spectrum diffusion signal using a surface acoustic wave matched filter comprising, on a surface of a substrate made of a piezoelectric material, an input side electrode into which the spectrum diffusion signal is supplied and an output side electrode constituting delay lines with taps which outputs a modulated signal when receiving the surface acoustic wave transmitted from the input side electrode, comprising steps of:

transmitting, in a transmitter side, a spectrum diffusion signal to which data representing a center frequency of a surface acoustic wave matched filter in the transmitter side are added with its carrier-frequencies being swept, transmitting, in a receiver side, a spectrum diffusion signal to which data representing a center frequency of a surface acoustic wave matched in the receiver side are added, on the carrier-frequency corresponding to the center frequency of the surface acoustic wave matched filter in the transmitter side which is added to the detect spectrum diffusion signal from the transmitter side when detecting, in the receiver side, a carrier-frequency to modulate a significant signal from the surface acoustic wave matched filter in the receiver side, and transmitting, in the transmitter side, successive spectrum diffusion signals on the carrier-frequency represented by the data of the center frequency of the surface acoustic wave matched filter in the receiver side, which are added to the detected spectrum diffusion signal from the receiver side.

2. A communication system using a surface acoustic wave matched filter as defined in claim 1, wherein the sweeping the carrier frequencies for the spectrum diffusion signal are performed stepwise and move to next step not in a given waiting time of signal transmission from the receiver side after transmission.

3. A communication system using a surface acoustic wave matched filter as defined in claim 2, wherein, in the transmitter side, the stepwise sweeping the carrier-frequency for the spectrum diffusion signal is performed alternately up and down within a given width from the designed center frequency of the surface acoustic wave matched filter in the transmitter side as its sweeping center.

4. A communication system using a surface acoustic wave matched filter as defined in claim 2, wherein the step width of the sweeping carrier-frequencies for the spectrum diffusion signal in the transmitter side is 100–800 KHz.

5. A communication system using a surface acoustic wave matched filter as defined in claim 1, wherein the range of the sweeping the carrier-frequencies for the spectrum diffusion signal in the transmitter side is a range within ±4 MHz from the designed center frequency of the surface acoustic wave matched filter in the transmitter side.

6. A communication system using a surface acoustic wave matched filter as defined in claim 1, wherein the data representing the center frequency of the surface acoustic wave matched filter in at least one of the transmitter side and the receiver side is the center frequency thereof or the deviation from the designed center frequency thereof.

7. A communication system using a surface acoustic wave matched filter as defined in claim 1, wherein the data representing the center frequency of the surface acoustic wave matched filter in at least one of the transmitter side and the receiver side is the operation temperature thereof or the deviation from the designed operation temperature thereof.

8. A communication system to demodulate a spectrum diffusion signal using a surface acoustic wave matched filter comprising, on a surface of a substrate made of a piezoelectric material, an input side electrode into which the spectrum diffusion signal is supplied and an output side electrode constituting delay lines with taps which outputs a modulated signal when receiving the surface acoustic wave transmitted from the input side electrode, wherein the spectrum diffusion signal to which the center frequency or the deviation from the designed center frequency of the surface acoustic wave matched filter is transmitted.

9. A communication system to demodulate a spectrum diffusion signal using a surface acoustic wave matched filter comprising, on a surface of a substrate made of a piezoelectric material, an input side electrode into which the spectrum diffusion signal is supplied and an output side electrode constituting delay lines with taps which outputs a modulated signal when receiving the surface acoustic wave transmitted from the input side electrode, wherein the spectrum diffusion signal to which the operation temperature or the deviation from the designed operation temperature of the surface acoustic wave matched filter is transmitted.

* * * * *